United States Patent
Yang et al.

(10) Patent No.: US 12,438,893 B2
(45) Date of Patent: Oct. 7, 2025

(54) METHOD FOR DETECTING DATA STEALTHY ATTACK ON NETWORKED SYSTEM WITH DIFFERENTIAL PRIVACY PROTECTION

(71) Applicant: SHANDONG COMPUTER SCIENCE CENTER (NATIONAL SUPERCOMPUTER CENTER IN JINAN), Shandong (CN)

(72) Inventors: Ming Yang, Shandong (CN); Fazong Wu, Shandong (CN); Xiaoming Wu, Shandong (CN); Xin Wang, Shandong (CN); Chao Mu, Shandong (CN); Zhenya Chen, Shandong (CN); Yanhan Wang, Shandong (CN)

(73) Assignee: SHANDONG COMPUTER SCIENCE CENTER (NATIONAL SUPERCOMPUTER CENTER IN JINAN), Jinan (CN)

( * ) Notice: Subject to any disclaimer, the term of this patent is extended or adjusted under 35 U.S.C. 154(b) by 0 days.

(21) Appl. No.: 18/847,213

(22) PCT Filed: Oct. 11, 2023

(86) PCT No.: PCT/CN2023/103124
§ 371 (c)(1),
(2) Date: May 27, 2025

(87) PCT Pub. No.: WO2024/098780
PCT Pub. Date: May 16, 2024

(65) Prior Publication Data
US 2025/0280009 A1    Sep. 4, 2025

(30) Foreign Application Priority Data

Nov. 8, 2022 (CN) .......................... 202211388174.0

(51) Int. Cl.
*H04L 9/40* (2022.01)
*H04L 41/14* (2022.01)

(52) U.S. Cl.
CPC ........ *H04L 63/1416* (2013.01); *H04L 41/145* (2013.01)

(58) Field of Classification Search
None
See application file for complete search history.

(56) References Cited

U.S. PATENT DOCUMENTS

2019/0230106 A1* 7/2019 Abbaszadeh ....... H04L 63/1441
2019/0230119 A1* 7/2019 Mestha ............... H04L 63/1416
(Continued)

FOREIGN PATENT DOCUMENTS

CN    106612287 A    5/2017
CN    108803565 A    11/2018
(Continued)

OTHER PUBLICATIONS

Chuadhry Mujeeb Ahmed et al., Noise Matters: Using Sensor and Process Noise Fingerprint to Detect Stealthy Cyber Attacks and Authenticate Sensors in CPS, 2018, Singapore University of Technology and Design, pp. 566-581. (Year: 2018).*

(Continued)

*Primary Examiner* — Joseph P Hirl
*Assistant Examiner* — Hassan Saadoun

(57) ABSTRACT

Disclosed is a method for detecting a data stealthy attack on a networked system with differential privacy protection, which falls within the technical field of information security. The method includes: firstly, modeling a networked system and designing an attack detection scheme based on system noise parameters; then, designing an optimal data stealthy attack scheme for an attacker according to known system information; and then, determining a moment of adding a (Continued)

privacy noise through a privacy noise scheduling scheme while ensuring privacy of sensitive data on the networked system, and achieving an optimal system control performance. Based on the above design, a possible data stealthy attack may be effectively detected on the basis of protecting the system data privacy and ensuring the optimal system performance.

4 Claims, 2 Drawing Sheets

(56) References Cited

U.S. PATENT DOCUMENTS

| | | | | |
|---|---|---|---|---|
| 2020/0137090 | A1* | 4/2020 | Holzhauer | H04L 63/1416 |
| 2021/0012028 | A1 | 1/2021 | Cabot et al. | |
| 2021/0357508 | A1* | 11/2021 | Elovici | G06F 11/3612 |
| 2021/0385079 | A1 | 12/2021 | Curty Alonso et al. | |
| 2022/0303286 | A1* | 9/2022 | Karam | G06N 3/08 |
| 2024/0340291 | A1* | 10/2024 | Hazan | G01S 7/40 |

FOREIGN PATENT DOCUMENTS

| | | | | |
|---|---|---|---|---|
| CN | 111970277 | A | | 11/2020 |
| CN | 112800422 | A | | 5/2021 |
| CN | 114301666 | A | | 4/2022 |
| CN | 114338161 | A | | 4/2022 |
| CN | 114372264 | A | | 4/2022 |
| CN | 114866352 | A * | 8/2022 | H04L 63/20 |

OTHER PUBLICATIONS

Ke Sun et al., Stealth Attacks on the Smart Grid, 2020, IEEE Transactions on Smart Grid, vol. 11, No. 2, pp. 1276-1285. (Year: 2020).*

1st Office Action of counterpart Chinese Patent Application No. 202211388174.0 issued on Dec. 22, 2022.

Notice of Allowance of counterpart Chinese Patent Application No. 202211388174.0 issued on Jan. 18, 2023.

Cheng-Sheng Yuan et al., Deep Fake Fingerprint Detection Modeling Copyright Protection Algorithms for Kijiji Differential Privacy, Journal of Communications, Sep. 2022, pp. 181-193, vol. 43, No. 9.

Xiao Huang et al., A Differential Privacy-preserving Model for Various Types of Attacks, Cybersecurity Techniques and Applications, 2020, pp. 41-43, vol. 8.

Wei Chen et al., A Study of Highly Stealthy Active Phishing Attacks on Wireless Networks and Their Prevention, Journal of Wuhan University (Science Edition), Apr. 2013, pp. 171-177, vol. 59, No. 2.

Qin Ye et al., Noise Encrypted Based Differential Location Privacy Protection in Wireless Sensors Network, Journal of Sensing Technology, Chinese Journal of Sensor and Actuators, Dec. 2019, pp. 1904-1910, vol. 32, No. 12.

Li-Yun Fan et al, A Modeling Study of a Recommender System Based on Thousand-Difference Privacy and Temporal Order, Journal of Electronics, Acta Electronica Sinica, Sep. 2017, pp. 2057-2064, vol. 45, No. 9.

* cited by examiner

METHOD FOR DETECTING DATA STEALTHY ATTACK ON NETWORKED SYSTEM WITH DIFFERENTIAL PRIVACY PROTECTION

This application claims priority from Chinese Application No. 202211388174.0, filed on Nov. 8, 2022, which is incorporated herein by reference in its entirety.

FIELD OF THE INVENTION

The present disclosure discloses a method for detecting a data stealthy attack on a networked system with differential privacy protection, which falls within the technical field of information security.

BACKGROUND OF THE INVENTION

The emergence of a networked system has broken the independent relative physical isolations between human and machines, factories and factories, and upstream and downstream industries, established a more open global industrial network, and brought great convenience for the rapid development and integration of modern industry. The mutual interconnection of data elements among different subjects are key links for the normal operation of the networked system. Data interconnection is an important link to achieve efficient interaction among original materials, products, machines, and managers, which plays a vital role in optimizing the allocation of resource, improving enterprise production efficiency, and providing differentiated product value-added services.

However, the intelligent development of the networked system in China is not comprehensive. At the same time, the data elements have not fully enabled the industrial economy. In particular, the security of massive real-time data generated by the networked system is not guaranteed, and there is a risk of privacy information being acquired by eavesdropping attackers. Malicious attackers may use system vulnerability to invade the networked system, tamper with data normally transmitted in the system, and interfere with the normal operation of the system, thus even causing the whole system instability. In particular, the data stealthy attack may damage the system by circumventing an anomaly detection scheme, has changeable modes and strong system adaptability, and is a risk seriously threatening the safe operation of the networked system.

Therefore, protecting the privacy information of the networked system from being obtained by eavesdropping attackers and efficiently detecting the stealthy attack to eliminate their impact on the stable operation of the system are key to be solved urgently to ensure the security of system data. However, the existing privacy protection scheme and the data stealthy attack detection scheme have the problem of isolated design. The impact of a privacy protection scheme on the system is not included in the design process of the attack detection scheme. The system has more uncertainties due to the deployment of the privacy protection scheme, whereby stealthy attackers may enhance the stealthiness of tampering with the system data by using the uncertainties. That is, the probability of not being detected by the system anomaly detection scheme is increased.

SUMMARY OF THE INVENTION

In view of the problems of the prior art, the present disclosure discloses a method for detecting a data stealthy attack on a networked system with privacy protection. The present disclosure maximizes the detection rate of the data stealthy attack on the networked system with differential privacy protection while ensuring that a privacy protection scheme has a controllable impact on the system.

SUMMARY

The method of the present disclosure includes: firstly, modeling a networked system and designing an attack detection scheme based on system noise parameters; then, designing an optimal data stealthy attack scheme for an attacker according to known system information; and then, determining a moment of adding a privacy noise through a privacy noise scheduling scheme while ensuring privacy of sensitive data on the networked system, and achieving an optimal system control performance. Based on the above design, a possible data stealthy attack may be effectively detected on the basis of protecting the system data privacy and ensuring the optimal system performance.

The detailed technical solutions of the present disclosure are as follows:

A method for detecting a data stealthy attack on a networked system with differential privacy protection includes:
  (a) modeling a networked system and designing an attack detection scheme based on system noise parameters;
  (b) designing an optimal data stealthy attack scheme for an attacker according to known system information; and
  (c) determining a moment of adding a privacy noise through a privacy noise scheduling scheme while ensuring privacy of sensitive data on the networked system, and achieving an optimal system control performance.

Preferably, according to the present disclosure, in step (a), the modeling a networked system includes:
  the networked system including: a controller, one or more controlled objects and a network transmission channel;
  The networked control system is modeled as a linear time-invariant system:

$$\begin{cases} x_{k+1} = Ax_k + Bu_k + w_k \\ y_k = Cx_k + v_k \end{cases} \quad (1)$$

In Eq. (1), $x_k$ represents a system state at time k; $x_{k+1}$ represents a system state at time k+1; $u_k$ represents a control signal generated by a controller; $y_k$ represents a measurement value of the sensor on a controlled object received by the controller; the system parameters A, B, C are known constant matrices: A is a system matrix, B is a control matrix, and C is an observation matrix; $w_k$, $v_k$ represent a process noise and a measurement noise, respectively, which are subject to a Gaussian distribution with a mean of 0 and a covariance of $R_w$ and $R_v$; and (A,B) is controllable, and (A,C) is observable.

Preferably, according to the present disclosure, in step (a), the designing an attack detection scheme based on system noise parameters includes:
  Based on historical sensor data, a real-time state of the networked system at a current time k is optimally estimated by using a Kalman filtering method, where the optimal estimation is prior knowledge of a person skilled in the art. A state estimation value $\hat{x}_k$ and a measurement value $y_k$ are combined to perform control information decision and data integrity attack signal discrimination. The decision of control information is determined by negative feedback determined by the measurement value. When a difference between the state estimation value and an observation value is greater than a certain threshold, a signal at the current time is attacked. That is, it is determined whether the measurement value at the current moment k is subjected to a data integrity attack by comparing the difference with the certain threshold.

Preferably, according to the present disclosure, in step (b), the designing an optimal data stealthy attack scheme for an attacker includes:

aggregating measurement data collected by a sensor from time 0 to k into a normal vector.

$$Y = [y(0)^T, y(1)^T, \ldots, y(k)^T]^T \qquad (2)$$

In Eq. (2), $y(0)^T, y(1)^T, \ldots, y(k)^T$ refer to the transpose of the measurement data collected by the sensor from time 0 to k, respectively; and the measurement data at each time is independent and subject to a Gaussian distribution with mean $\mu$ and variance $\sigma^2$. The present disclosure assumes that an attacker can obtain the system parameters and the measurement value due to the increasingly stronger learning ability of the attacker and the vulnerability of the networked control system. The goal of a malicious attacker is to obtain a maximized attack effect under the premise that the attacker is kept from being detected. That is, the attacker aims to find an optimal attack signal distribution $f^*_a$, whereby an expectation of a difference between an attack vector $Y^a$ and a normal vector Y is maximal, and a deviation between an attack signal distribution $f_a$ and a normal signal distribution $f_n$ is maintained within an acceptable threshold. The equation corresponding to the above conditions is:

The expectation of the difference between the attack vector and the normal vector Y is maximized:

$$\max E[|Y^a - Y|_1]. \qquad (3)$$

The deviation between the attack signal distribution $f_a$ and the normal signal distribution $f_n$ is maintained within the acceptable threshold $\gamma$:

$$s.t. D_{KL}(f_a|f_n) \leq \gamma \qquad (4),$$

and $\int f_a dx = 1 \qquad (5).$

In Eqs. (3)-(5), $|\cdot|_1$ represents a 1 norm of a matrix.

$$D_{KL}(f_a|f_n) = \int_x f_a(x) \ln \frac{f_a(x)}{f_n(x)} dx$$

represents KL divergence between the attack signal distribution $f_a$ and the normal signal distribution $f_n$. The normal signal distribution $f_n$ represents a normal system data distribution or a data distribution (fixed mean Gaussian distribution) disturbed by a differential privacy scheme based on a privacy protection demand. As a distance between the two distributions is smaller, the distributions are more similar. To solve a constrained optimization problem, a Lagrange function of the optimization problem is denoted as:

$$\Gamma(x) = \int (x-2\mu)x f_a(x)dx + \sigma^2 + \mu^2 +$$

$$\kappa_1 \left( \int_x f_a(x) \ln \frac{f_a(x)}{f_n(x)} dx - \gamma \right) + \kappa_2 \left( \int_x f_a(x) dx - 1 \right) \qquad (6)$$

In Eq. (6), $\mu$ and $\sigma^2$ refer to the mean and variance of the Gaussian distribution in Eq. (2).

x is an integral variable, $k_1, k_2$ is the Lagrange multiplier, and a variance relationship between the normal signal distribution and the optimal attack signal distribution is obtained by taking a partial derivative of parameters of the Lagrange function:

$$(x - 2\mu)x + \kappa_1 \left( \ln \frac{f_a(x)}{f_n(x)} - 1 \right) + \kappa_2 = 0 \qquad (7)$$

Eq. (7) is solved to derive:

$$f^*_a(x) = f_n(x) e^{\frac{\kappa_2 - \kappa_1 - x(x - 2\mu)}{\kappa_1}} \qquad (8)$$

In Eq. (8), the Lagrange multiplier is obtained by substituting the optimal attack signal distribution into Eqs. (3), (4) and (5) and solving the equations, and a specific value of the Lagrange multiplier is related to a form of adding a differential privacy noise and the acceptable threshold $\gamma$ of the attacker.

In order to ensure differential privacy, the measurement value is disturbed with a noise of the Gaussian distribution in the present disclosure, and a probability density function of a disturbance Gaussian noise is:

$$f_0(x) = \frac{1}{\sigma_0 \sqrt{2\pi}} e^{-\frac{(x-\mu_0)^2}{2\sigma_0^2}} \qquad (9)$$

In Eq. (9), $\mu_0, \sigma_0$ are a mean and standard deviation of the disturbance Gaussian noise, respectively; furthermore, the probability density function of a normal signal is:

$$f_n(x) = \frac{1}{\sqrt{2\pi(\sigma_0^2 + \sigma^2)}} e^{-\frac{[x-(\mu_0+\mu)]^2}{2(\sigma_0^2+\sigma^2)}} \qquad (10)$$

The optimal attack signal distribution is finally solved as:

$$f^*_a(x) = \frac{1}{\sqrt{2\pi(\sigma_0^2 + \sigma^2)}} e^{\frac{\kappa_2-\kappa_1}{\kappa_1} - \frac{1}{\kappa_1} x[x-2(\mu_0+\mu)] - \frac{[x-(\mu_0+\mu)]^2}{2(\sigma_0^2+\sigma^2)}} \qquad (11)$$

The optimal data stealthy attack scheme is a method for sampling an attack signal from the optimal attack signal distribution to attack the networked system.

Preferably, according to the present disclosure, in step (c), the determining a moment of adding a privacy noise through a privacy noise scheduling scheme includes:

Since the massive real-time data generated by the networked system uses plain text in the transmission process, a random noise $\eta_k$ conforming to the Gaussian distribution is added to a real-time measurement value $y_k$ requiring privacy protection to obtain disturbance data $\tilde{y}_k$. The random noise is an additional noise to ensure the privacy of the data. The variance of the random noise is $\eta_k$:

$$\sigma_0^2 = \frac{2(\Delta f)^2 \ln(1.25/\delta)}{\epsilon^2}; \quad (12)$$

$$\Delta f = \max_{D,D'} \|f(D) - f(D')\|_2 \quad (13)$$

In Eq. (12) and Eq. (13), $\Delta f$ is global sensitivity; D and D' are adjacent data sets obtained from statistical characteristics of the real-time measurement value, namely $\|D-D'\|_1 \leq 1$; $\epsilon$ is a privacy budget at each time, and determines the degree of privacy protection; $\delta$ is another privacy parameter of $(\epsilon,\delta)$-differential privacy protection scheme, where $0 < \delta < 1$. The disturbed real-time measurement value after adding the disturbance Gaussian noise is:

$$\tilde{y}_k = y_k + \eta_k = Cx_k + v_k + \eta_k \quad (14)$$

where $\eta_k$ and $y_k$ have the same dimension. Since the scale of the added noise will affect the control performance of the system, it is considered to use the original measurement noise $v_k$ together with the added additional noise to achieve the required degree of privacy protection.

The following state feedback mode is considered:

$$u_k = L\hat{x}_k \quad (15)$$

In Eq. (15), L is a feedback gain, $\hat{x}_k$ is a system state estimation value at time k, a state residual is $e_k = x_k - \hat{x}_k$, and an expanded system state is rewritten as:

$$z_k = \begin{bmatrix} x_k \\ e_k \end{bmatrix} \quad (16)$$

An iteration form of the expanded system state is as follows:

$$z_{k+1} = \begin{bmatrix} A+BK & -BK \\ 0 & A-LC \end{bmatrix} z_k + \begin{bmatrix} I & 0 \\ I & -L \end{bmatrix} \begin{bmatrix} w_k \\ v_k \end{bmatrix} \quad (17)$$

In Eq. (17), $z_{k+1}$ represents the expanded system state at time k+1; I is an identity matrix of the same dimension as A, and K represents a Kalman gain matrix.

$$F = \begin{bmatrix} A+BK & -BK \\ 0 & A-LC \end{bmatrix}, G = \begin{bmatrix} I & 0 \\ I & -L \end{bmatrix}, \psi_k = \begin{bmatrix} I & 0 \\ I & -L \end{bmatrix} \begin{bmatrix} w_k \\ v_k \end{bmatrix} \quad (18)$$

In Eq. (18), F is a first auxiliary matrix, G is a second auxiliary matrix, and $\psi_k$ is a third auxiliary matrix.

A covariance matrix of $\psi_k$ is:

$$R_{\psi_k} = E[\psi_k \psi_k^T] = G \begin{bmatrix} R_w & 0 \\ 0 & R_v \end{bmatrix} G^T \quad (19)$$

In Eq. (19), E represents the expectation.

If the expectation and covariance of the expanded system state are $m_k$, $n_k$, respectively, an iteration form of $$n_k = E[(z_k - m_k)(z_k - m_k)^T] \text{ is:}$$

$$n_{k+1} = Fn_k F^T + R_{\psi_k} \quad (20)$$

The covariance matrix of $\psi_k$ after adding the differential privacy noise is rewritten as:

$$R_{\psi_k} = G \begin{bmatrix} R_w & 0 \\ 0 & R_v + R_{\eta_k} \end{bmatrix} G^T \quad (21)$$

In Eq. (21), $R_{\eta_k} = \sigma_0^2 \cdot I$ is the covariance matrix of the added differential privacy noise.

The covariance of the expanded system state is:

$$n_{k+1} = F n_k F^T + R_{\psi_k} + R_{\eta_k} \quad (22)$$

If the covariance of the expanded system state at a start time is $n_0$, $$n_{k+1} = F^k n_0 (F^k)^T + \sum_{i=1}^{k} F^{k-i} R_{\psi_i} [F^{k-i}]^T \quad (23)$$

When $F^k$ represents a $k^{th}$ power of a Kalman gain matrix F, $F^{k-i}$ represents a k–$i^{th}$ power of the Kalman gain matrix F, and i is a summation variable, if all eigenvalues of F are less than 1, namely (A+BK)(A–LC)<1, $n_k$ will converge to a constant N, and the variance of an added actual noise satisfies:

$$R_{\eta_k} > (\sigma')^2 I - NCC^T - R_v \quad (24)$$

In Eq. (24), $(\sigma')^2$ is a total noise scale for achieving differential privacy protection.

The data on the networked system has a certain time correlation. If the data in a time period M is correlated with each other, a privacy budget $\xi$ is allocated to the data in the time period M, and an optimization problem is constructed to schedule the time when the privacy noise is added so as to minimize the impact of the privacy noise on the control performance of the system. The goal is to maximize a detection rate of a stealthy attack at an acceptable control cost:

$$\max_{\theta} P_d \quad (25)$$
$$\text{s.t. } J < \Omega$$

In Eq. (25), $$\theta = \{\theta_0, \theta_1, \ldots, \theta_M\}$$

is a sequence of privacy noises added within a time period M, where 1 represents noise addition, and 0 represents no noise addition; J represents the control cost; and $\Omega$ represents an upper limit of the acceptable control cost.

Preferably, according to the present disclosure, an approximate detection rate is introduced into the maximization of the detection rate of the stealthy attack at the acceptable control cost. Since the calculation of the detection rate involves a multivariate integration operation, the approximate detection rate is introduced:

$$\beta_k = \begin{cases} \beta_k^1, & \text{if } \eta_k \neq 0, y_k^a \neq 0 \\ \beta_k^2, & \text{if } \eta_k \neq 0, y_k^a = 0 \\ \beta_k^3, & \text{if } \eta_k = 0, y_k^a \neq 0 \\ 0, & \text{if } \eta_k = 0, y_k^a = 0 \end{cases}$$

In Eq. (26), $\eta_k$, $y_k^a$ represent a privacy noise and an attack signal added at time k, respectively, and a missed detection rate at time k is $$\xi_k^j = 1 - \beta_k^j, j = \{1, 2, 3\}.$$

If $OT_{\beta_j}$ represents the number of attacks over a period of time, a total missed detection rate is represented as:

$$P_{ud} = \prod_{j=1}^{3} (\xi^j)^{OT_{\beta_j}} \quad (27)$$

$\xi^j$ represents the missed detection rate in the first three cases described in Eq. (26).

Considering the attacker starts an attack at any time within a time period, an average missed detection rate is obtained by averaging the total missed detection rate:

$$\overline{P}_{ud} = \frac{1}{M}\sum_{i=0}^{M-1} P_{ud} \quad (28)$$

To obtain an optimal noise addition sequence to maximize the detection rate, the optimization problem is rewritten as:

$$\max_{\theta} P_d \quad (29)$$
$$\text{s.t. } \frac{q}{M} \leq \Theta$$

In Eq. (29), $$\max_{\theta} P_d$$

refers to that the goal is to maximize the detection rate of the stealthy attack at the acceptable control cost in Eq. (25), and $P_d$ is the detection rate of the stealthy attack; q represents the number of additions of the privacy noise, and θ is the percentage of noise converted at the same control cost. It can be seen that as more privacy noises are added, the detection rate is higher. When $\xi^1 \neq \xi^2 \xi^3$ is satisfied, $$\frac{-2(1 + \xi^1 - \xi^2 - \xi^3)}{\min(\xi^2, \xi^2\xi^3)\ln\frac{\xi^1}{\xi^2\xi^3}} \leq \frac{1}{M} \quad (30)$$

The moment of adding the privacy noise is finally solved.

In summary, in order to obtain an optimal privacy noise scheduling scheme, the following policies should be followed:

1) Under the premise of meeting a cost control demand, more privacy noises should be added.
2) Gaussian noises required to protect privacy should be added evenly as much as possible.

The technical advantages of the present disclosure are as follows:

1) In the present disclosure, by establishing an optimization problem based on a maximum attack impact and constructing an optimal data integrity attack accordingly, the attack impact in the worst case can be simulated. Compared with the prior art, the present disclosure integrates the existing attacks against a networked control system by formalizing the attacks, whereby a variety of attacks can be simulated and uniformly detected.
2) By using a measurement noise, the present disclosure reduces the scale of an additional noise and reduces the impact of a differential privacy scheme on the system control performance under the premise that the privacy protection effect is not weakened. By effectively scheduling a differential privacy noise, better system performance and control performance are achieved on the whole.
3) The present disclosure can effectively construct attack modes and embody the underlying logic of stealthy attacks. In order to reduce the negative impact of a differential privacy protection scheme on state estimation, attack detection and control cost, the scale of the differential privacy noise is minimized, and the moment of adding the differential privacy noise is scheduled.

DETAILED DESCRIPTION OF THE EMBODIMENTS

The present disclosure will be described in detail below in connection with embodiments but is not limited thereto.

Embodiment 1

Figure 1:
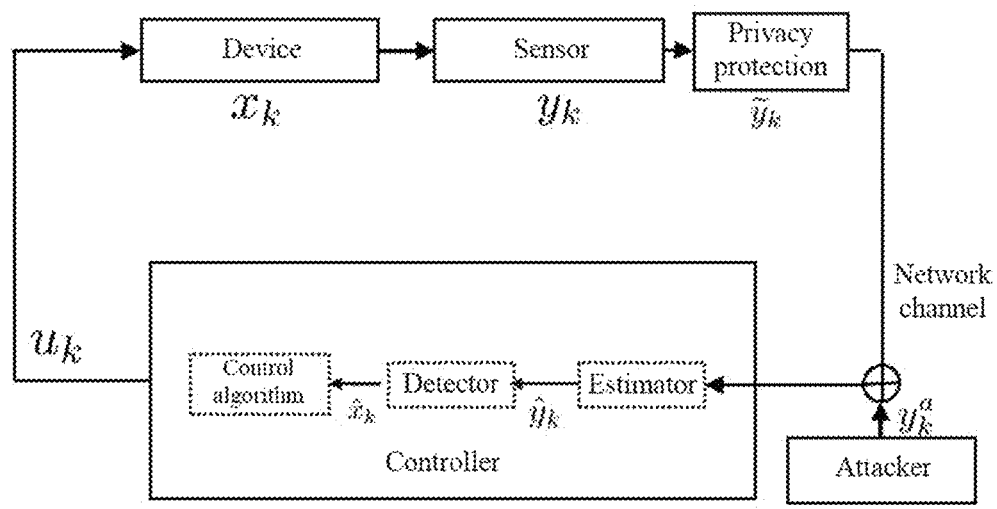
FIG. 1 is a schematic diagram of a method for detecting a data stealthy attack on a networked system with privacy protection constraints according to the present disclosure.

As shown in FIG. 1, a method for detecting a data stealthy attack on a networked system with differential privacy protection includes:

(a) modeling a networked system and designing an attack detection scheme based on system noise parameters;

(b) designing an optimal data stealthy attack scheme for an attacker according to known system information; and (c) determining a moment of adding a privacy noise through a privacy noise scheduling scheme while ensuring privacy of sensitive data on the networked system, and achieving an optimal system control performance.

In step (a), the modeling a networked system includes:

the networked system including: a controller, one or more controlled objects and a network transmission channel;

modeling the networked system as a linear time-invariant model:

$$\begin{cases} x_{k+1} = Ax_k + Bu_k + w_k \\ y_k = Cx_k + v_k \end{cases} \quad (1)$$

In Eq. (1), $x_k$ represents a system state at time k; $x_{k+1}$ represents a system state at time k+1; $u_k$ represents a control signal generated by a controller; $y_k$ represents a measurement value of the sensor on a controlled object received by the controller; the system parameters A, B, C are known constant matrices: A is a system matrix, B is a control matrix, and C is an observation matrix; $w_k$, $v_k$ represent a process noise and a measurement noise, respectively, which are subject to a Gaussian distribution with a mean of 0 and a covariance of $R_w$ and $R_v$; and (A,B) is controllable, and (A,C) is observable.

In step (a), the designing an attack detection scheme based on system noise parameters includes:

Based on historical sensor data, a real-time state of the networked system at a current time k is optimally estimated by using a Kalman filtering method, where the optimal estimation is prior knowledge of a person skilled in the art. A state estimation value $\hat{x}_k$ and a measurement value $y_k$ are combined to perform control information decision and data integrity attack signal discrimination. The decision of control information is determined by negative feedback determined by the measurement value. When a difference between the state estimation value and an observation value is greater than a certain threshold, a signal at the current time is attacked. That is, it is determined whether the measurement value at the current moment k is subjected to a data integrity attack by comparing the difference with the certain threshold.

In step (b), the designing an optimal data stealthy attack scheme for an attacker includes:

aggregating measurement data collected by a sensor from time 0 to k into a normal vector.

$$Y = \begin{bmatrix} y(0)^T, y(1)^T, \ldots, y(k)^T \end{bmatrix}^T \quad (2)$$

In Eq. (2), $$y(0)^T, y(1)^T, \ldots, y(k)^T$$

refer to the transpose of the measurement data collected by the sensor from time 0 to k, respectively; and the measurement data at each time is independent and subject to a Gaussian distribution with a mean of μ and a variance of $\sigma^2$. The present disclosure assumes that an attacker can obtain the system parameters and the measurement value due to the increasingly stronger learning ability of the attacker and the vulnerability of the networked system. The goal of a malicious attacker is to obtain a maximized attack effect under the premise that the attacker is kept from being detected. That is, the attacker aims to find an optimal attack signal distribution $f^*_a$, whereby an expectation of a difference between an attack vector $Y^u$ and a normal vector Y is maximal, and a deviation between an attack signal distribution $f_a$ and a normal signal distribution $f_n$ is maintained within an acceptable threshold. The Eq. corresponding to the above conditions is:

The expectation of the difference between the attack vector $Y^u$ and the normal vector Y is maximized:

$$\max E[|Y^a - Y|_1]. \quad (3)$$

The deviation between the attack signal distribution $f_a$ and the normal signal distribution $f_n$ is maintained within the acceptable threshold γ:

$$s.t. D_{KL}(f_a|f_n) < \gamma \quad (4);$$

also, $\int f_a dx = 1 \quad (5).$

In Eqs. (3)-(5), $|\cdot|_1$ represents a 1 norm of a matrix.

$$D_{KL}(f_a|f_n) = \int_x f_a(x) \ln \frac{f_a(x)}{f_n(x)} dx$$

represents KL divergence between the attack signal distribution $f_a$ and the normal signal distribution $f_n$. The normal signal distribution $f_n$ represents a normal system data distribution or a data distribution (fixed mean Gaussian distribution) disturbed by a differential privacy scheme based on a privacy protection demand. As a distance between the two distributions is smaller, the distributions are more similar. To solve a constrained optimization problem, a Lagrange function of the optimization problem is denoted as:

$$\Gamma(x) = \int (x - 2\mu) x f_a(x) dx + \sigma^2 + \quad (6)$$

$$\mu^2 + \kappa_1 \left( \int_x f_a(x) \ln \frac{f_a(x)}{f_n(x)} dx - \gamma \right) + \kappa_2 \left( \int_x f_a(x) dx - 1 \right)$$

In Eq. (6), μ and $\sigma^2$ refer to the mean and variance of the Gaussian distribution in Eq. (2); x is an integral variable, $k_1, k_2$ is a Lagrange multiplier, and a variance relationship between the normal signal distribution and the optimal attack signal distribution is obtained by taking a partial derivative of parameters of the Lagrange function:

$$(x - 2\mu)x + \kappa_1 \left( \ln \frac{f_a(x)}{f_n(x)} - 1 \right) + \kappa_2 = 0 \quad (7)$$

Eq. (7) is solved to derive:

$$f_a^*(x) = f_n(x) e^{\frac{\kappa_2 - \kappa_1 - x(x - 2\mu)}{\kappa_1}} \quad (8)$$

In Eq. (8), the Lagrange multiplier is obtained by substituting the optimal attack signal distribution into Eqs. (3), (4)

and (5) and solving the equations, and a specific value of the Lagrange multiplier is related to a form of adding a differential privacy noise and the acceptable threshold γ of the attacker.

In order to ensure differential privacy, the measurement value is disturbed with a noise of the Gaussian distribution in the present disclosure, and a probability density function of a disturbance Gaussian noise is:

$$f_0(x) = \frac{1}{\sigma_0\sqrt{2\pi}} e^{-\frac{(x-\mu_0)^2}{2\sigma_0^2}} \tag{9}$$

In Eq. (9), $\mu_0$, $\sigma_0$ are a mean and standard deviation of the disturbance Gaussian noise, respectively; furthermore, a probability density function of a normal signal is:

$$f_n(x) = \frac{1}{\sqrt{2\pi(\sigma_0^2 + \sigma^2)}} e^{-\frac{[x-(\mu_0-\mu)]^2}{2(\sigma_0^2+\sigma^2)}} \tag{10}$$

The optimal attack signal distribution is finally solved as:

$$f_a^*(x) = \frac{1}{\sqrt{2\pi(\sigma_0^2 + \sigma^2)}} e^{\frac{\kappa_2-\kappa_1}{\kappa_1} - \frac{1}{\kappa_1}x[x-2(\mu_0+\mu)] - \frac{[x-(\mu_0+\mu)]^2}{2(\sigma_0^2+\sigma^2)}} \tag{11}$$

The optimal data stealthy attack scheme is a method for sampling an attack signal from the optimal attack signal distribution to attack the networked system.

In step (c), the determining a moment of adding a privacy noise through a privacy noise scheduling scheme includes:

Since the massive real-time data generated by the networked system uses plain text in the transmission process, a random noise $\eta_k$ conforming to the Gaussian distribution is added to a real-time measurement value $y_k$ requiring privacy protection to obtain disturbance data $\tilde{y}_k$. The random noise is an additional noise to ensure the privacy of the data. The variance of the random noise $\eta_k$ is:

$$\sigma_0^2 = \frac{2(\Delta f)^2 \ln(1.25/\delta)}{\epsilon^2} \tag{12}$$

$$\Delta f = \max_{D,D'} \|f(D) - f(D')\|_2 \tag{13}$$

In Eqs. (12) and (13), $\Delta f$ is global sensitivity; D and D' are adjacent data sets obtained from statistical characteristics of the real-time measurement value, namely $\|D-D'\|_1 \leq 1$; $\epsilon$ is a privacy budget at each time, and the size thereof determines the degree of privacy protection; $\delta$ is another privacy parameter of a ($\epsilon,\delta$)-differential privacy protection scheme having a value range of $0<\delta<1$; and a disturbed real-time measurement value after adding the disturbance Gaussian noise is:

$$\tilde{y}_k = y_k + \eta_k = Cx_k + v_k + \eta_k \tag{14}$$

In Eq. (14), $\eta_k$ and $y_k$ have the same dimension. Since the scale of the added noise will affect the control performance of the system, it is considered to use the original measurement noise $v_k$ together with the added additional noise to achieve the required degree of privacy protection.

The following state feedback mode is considered:

$$u_k = L\hat{x}_k \tag{15}$$

In Eq. (15), $\hat{x}_k$ is a feedback gain, is a system state estimation value at time k, a state residual is $e_k = x_k - \hat{x}_k$, and an expanded system state is rewritten as:

$$z_k = \begin{bmatrix} x_k \\ e_k \end{bmatrix} \tag{16}$$

An iteration form of the expanded system state is as follows:

$$z_{k-1} = \begin{bmatrix} A+BK & -BK \\ 0 & A-LC \end{bmatrix} z_k + \begin{bmatrix} I & 0 \\ I & -L \end{bmatrix} \begin{bmatrix} w_k \\ v_k \end{bmatrix} \tag{17}$$

In Eq. (17), $z_{k+1}$ represents the expanded system state at time k+1; I is an identity matrix of the same dimension as A, and K represents a Kalman gain matrix.

$$F = \begin{bmatrix} A+BK & -BK \\ 0 & A-LC \end{bmatrix}, G = \begin{bmatrix} I & 0 \\ I & -L \end{bmatrix}, \psi_k = \begin{bmatrix} I & 0 \\ I & -L \end{bmatrix} \begin{bmatrix} w_k \\ v_k \end{bmatrix} \tag{18}$$

In Eq. (18), F is a first auxiliary matrix, G is a second auxiliary matrix, and $\psi_k$ is a third auxiliary matrix.

A covariance matrix of $\psi_k$ is:

$$R_{\psi_k} = E[\psi_k \psi_k^T] = G \begin{bmatrix} R_w & 0 \\ 0 & R_v \end{bmatrix} G^T \tag{19}$$

In Eq. (19), E represents the expectation.

If the expectation and covariance of the expanded system state are $m_k$, $n_k$, respectively, an iteration form of $$n_k = E[(z_k - m_k)(z_k - m_k)^T] \text{ is:}$$

$$n_{k+1} = Fn_k F^T + R_{\psi_k} \tag{20}$$

The covariance matrix of $\psi_k$ after adding the differential privacy noise is rewritten as:

$$R_{\psi_k} = G \begin{bmatrix} R_w & 0 \\ 0 & R_v + R_{\eta_k} \end{bmatrix} G^T \tag{21}$$

In Eq. (21), $R_{n_-} = \sigma_0^2 \cdot I$ is the covariance matrix of the added differential privacy noise.

The covariance of the expanded system state is:

$$n_{k+1} = Fn_k F^T + R\psi_k + R_{\eta_k} \tag{22}$$

If the covariance of the expanded system state at a start time is $n_0$, $$n_{k+1} = F^k n_0 (F^k)^T + \sum_{i=1}^{k} F^{k-i} R_{\psi_i} [F^{k-i}]^T \qquad (23)$$

When $F^k$ represents a $k^{th}$ power of a Kalman gain matrix F, $F^{k-i}$ represents a k-$i^{th}$ power of the Kalman gain matrix F, and i is a summation variable, if all eigenvalues of F are less than 1, namely (A+BK)(A−LC)<1, $n_k$, will converge to a constant N, and the variance of an added actual noise satisfies:

$$R_{n_k} > (\sigma')^2 I - NCC^T - R_v \qquad (24)$$

In Eq. (24), $(\sigma')^2$ is a total noise scale for achieving differential privacy protection.

The data on the networked system has a certain time correlation. If the data in a time period M is correlated with each other, a privacy budget $\xi$ is allocated to the data in the time period M, and an optimization problem is constructed to schedule the time when the privacy noise is added so as to minimize the impact of the privacy noise on the control performance of the system. The goal is to maximize a detection rate of a stealthy attack at an acceptable control cost:

$$\max_{\theta} P_d \qquad (25)$$
$$\text{s.t. } \tilde{J} < \Omega$$

In Eq. (25), $$\theta = \{\theta_0, \theta_1, \ldots, \theta_M\}$$

is a sequence of privacy noises added within a time period M, where 1 represents noise addition, and 0 represents no noise addition; $\tilde{J}$ represents the control cost; and $\Omega$ represents an upper limit of the acceptable control cost.

An approximate detection rate is introduced into the maximization of the detection rate of the stealthy attack at the acceptable control cost. Since the calculation of the detection rate involves a multivariate integration operation, the approximate detection rate is introduced:

$$\beta_k = \begin{cases} \beta_k^1, & \text{if } \eta_k \neq 0, y_k^a \neq 0 \\ \beta_k^2, & \text{if } \eta_k \neq 0, y_k^a = 0 \\ \beta_k^3, & \text{if } \eta_k = 0, y_k^a \neq 0 \\ 0, & \text{if } \eta_k = 0, y_k^a = 0 \end{cases} \qquad (26)$$

In Eq. (26), $n_k$, $y_k^a$ represent a privacy noise and an attack signal added at time k, respectively, and a missed detection rate at time k is $$\xi_k^j = 1 - \beta_k^j, \; j = \{1, 2, 3\}.$$

If $OT_{\beta_j}$ represents the number of attacks over a period of time, a total missed detection rate is represented as:

$$P_{ud} = \prod_{j=1}^{3} (\xi^j)^{OT_{\beta_j}} \qquad (27)$$

$\xi^j$ represents the missed detection rate in the first three cases described in Eq. (26).

Considering the attacker starts an attack at any time within a time period, an average missed detection rate is obtained by averaging the total missed detection rate:

$$\overline{P}_{ud} = \frac{1}{M} \prod_{i=0}^{M-1} P_{ud} \qquad (28)$$

To obtain an optimal noise addition sequence to maximize the detection rate, the optimization problem is rewritten as:

$$\max_{\theta} P_d \qquad (29)$$
$$\text{s.t. } \frac{q}{M} \leq \Theta$$

In Eq. (29), $$\max_{\theta} P_d$$

refers to that the goal is to maximize the detection rate of the stealthy attack at the acceptable control cost in Eq. (25), and $P_d$ is the detection rate of the stealthy attack; q represents the number of additions of the privacy noise, and $\theta$ is the percentage of noise converted at the same control cost. It can be seen that as more privacy noises are added, the detection rate is higher. When $\xi^1 \neq \xi^2 \xi^3$ is satisfied, $$\frac{-2(1 + \xi^1 - \xi^2 - \xi^3)}{\min(\xi^1, \xi^2, \xi^3) \ln \frac{\xi^1}{\xi^2 \xi^3}} \leq \frac{1}{M} \qquad (30)$$

The moment of adding the privacy noise is finally solved.

Figure 2:
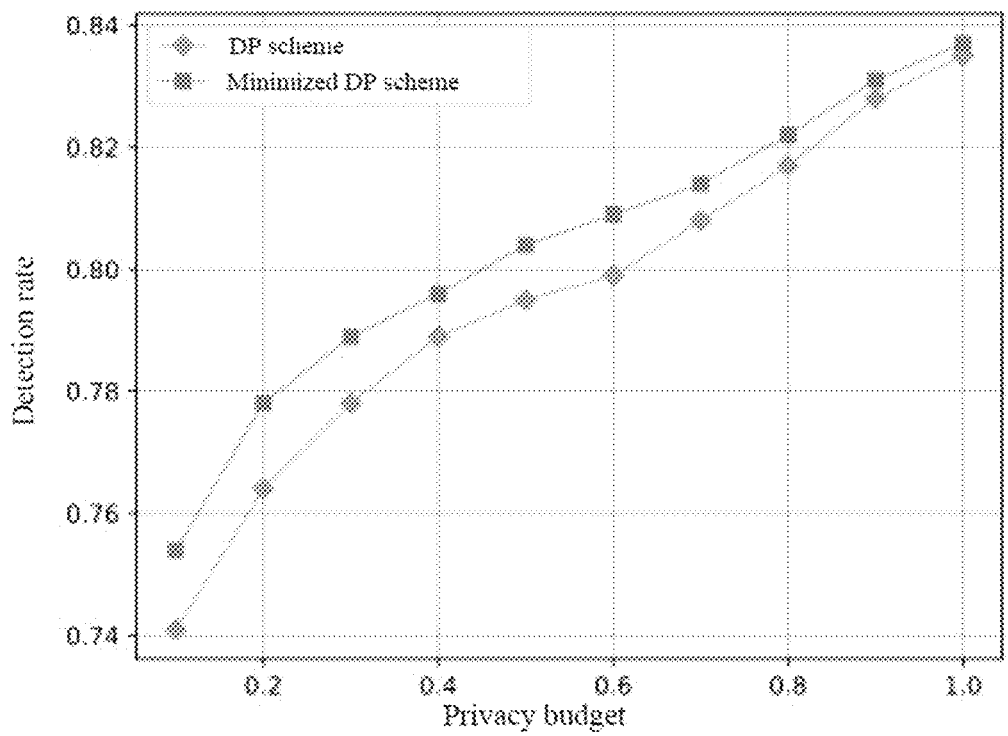
FIG. 2 is a schematic diagram of a detection rate varying with a privacy budget when a minimized noise and a normal noise are designed, where "DP scheme" refers to a normal noise design scheme, "minimized DP scheme" refers to a minimized DP noise design scheme, and the abscissa is the above-mentioned privacy budget.

It can be seen from FIG. 2 that the detection rate varies with the privacy budget. In either case, the detection rate at the time of adding a minimized noise is higher than the detection rate at the time of adding a normal noise.

Figure 3:
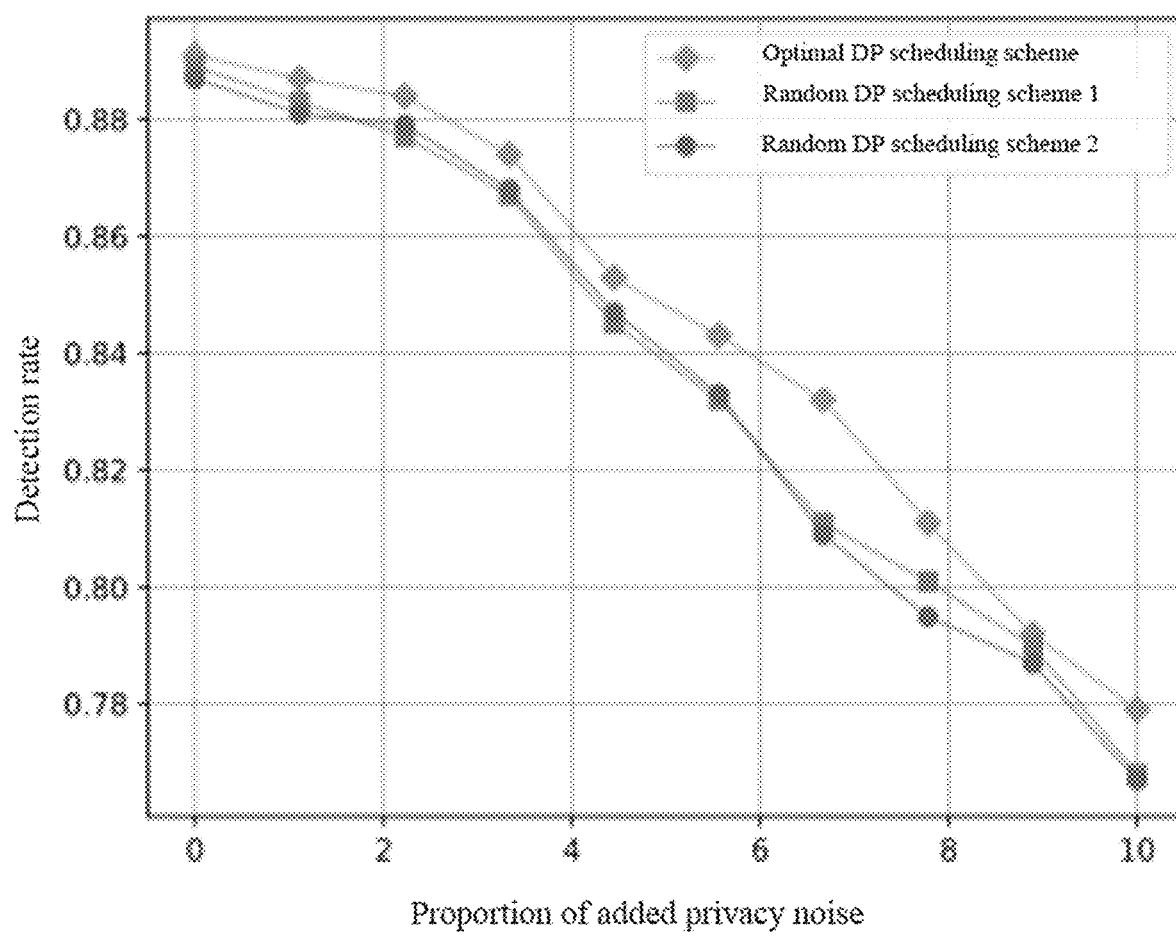
FIG. 3 is a schematic diagram of a noise scheduling scheme designed by the present disclosure in comparison with two other random noise addition schemes, where the abscissa is the proportion of an added noise to a total time, and "optimal DP scheduling scheme" is the noise scheduling scheme designed by the present disclosure.

As shown in FIG. 3, the detection rate using the optimal noise scheduling scheme designed by the present disclosure is generally higher than that using a randomly added scheme.

The invention claimed is:

1. A method for detecting a data stealthy attack on a networked system with differential privacy protection, comprising:
    (a) modeling a networked system and designing an attack detection scheme based on system noise parameters;
    (b) designing an optimal data stealthy attack scheme for an attacker according to known system information; and (c) determining a moment of adding a privacy noise through a privacy noise scheduling scheme while ensuring privacy of sensitive data on the networked system, wherein in step (b), the designing an optimal data stealthy attack scheme for an attacker comprises: aggregating measurement data collected by a sensor from time 0 to k into a normal vector;

$$Y = [y(0)^T, y(1)^T, \ldots, y(k)^T]^T \tag{2}$$

in Eq (2), $y(0)^T, y(1)^T, \ldots, y(k)^T$ refer to the transpose of the measurement data collected by the sensor from time 0 to k, respectively; the measurement data at each time is independent and subject to a Gaussian distribution with a mean of $\mu$ and a variance of $\sigma^2$; the attacker aims to find an optimal attack signal distribution $f^*_a$, whereby an expectation of a difference between an attack vector $Y^a$ and a normal vector $Y$ is maximal:

$$\max E[|Y^a - Y|_1]; \tag{3}$$

a deviation between an attack signal distribution $f_a$ and a normal signal distribution $f_n$ is maintained within an acceptable threshold $\gamma$:

$$s.t. D_{KL}(f_a|f_n) \leq \gamma \tag{4}$$

$$\text{also, } \int f_a dx = 1 \tag{5}$$

in Eqs. (3)-(5), $|\cdot|_1$ represents a 1 norm of a matrix;

$$D_{KL}(f_a|f_n) = \int_x f_a(x) \ln \frac{f_a(x)}{f_n(x)} dx$$

represents KL divergence between the attack signal distribution $f_a$ and the normal signal distribution $f_n$;
the normal signal distribution $f_n$ represents a normal system data distribution or a data distribution disturbed by a differential privacy scheme based on a privacy protection demand, and to solve a constrained optimization problem, a Lagrange function of the optimization problem is denoted as:

$$\Gamma(x) = \int (x-2\mu)x f_a(x) dx + \sigma^2 + \mu^2 +$$

$$\kappa_1 \left( \int_x f_a(x) \ln \frac{f_a(x)}{f_n(x)} dx - \gamma \right) + \kappa_2 \left( \int_x f_a(x) dx - 1 \right) \tag{6}$$

in Eq. (6), $\mu$ and $\sigma^2$ refer to the mean and variance of the Gaussian distribution in Eq. (2); x is an integral variable, $k_1$, $k_2$, is a Lagrange multiplier, and a variance relationship between the normal signal distribution and the optimal attack signal distribution is obtained by taking a partial derivative of parameters of the Lagrange function:

$$(x-2\mu)x - \kappa_1 \left( \ln \frac{f_a(x)}{f_n(x)} - 1 \right) + \kappa_2 = 0; \tag{7}$$

Eq. (7) is solved to derive:

$$f^*_a(x) = f_n(x) e^{\frac{\kappa_2 - \kappa_1 - x(x-2\mu)}{\kappa_1}} \tag{8}$$

in Eq. (8), the Lagrange multiplier is obtained by substituting the optimal attack signal distribution into Eqs. (3), (4) and (5) and solving the equations, and a specific value of the Lagrange multiplier is related to a form of adding a differential privacy noise and the acceptable threshold $\gamma$ of the attacker;
a measurement value is disturbed with a noise of the Gaussian distribution, and a probability density function of a disturbance Gaussian noise is:

$$f_0(x) = \frac{1}{\sigma_0 \sqrt{2\pi}} e^{-\frac{(x-\mu_0)^2}{2\sigma_0^2}} \tag{9}$$

in Eq. (9), $\mu_0, \sigma_0$ are a mean and standard deviation of the disturbance Gaussian noise, respectively; furthermore a probability density function of a normal signal is:

$$f_n(x) = \frac{1}{\sqrt{2\pi(\sigma_0^2 + \sigma^2)}} e^{-\frac{[x-(\mu_0+\mu)]^2}{2(\sigma_0^2+\sigma^2)}} \tag{10}$$

the optimal attack signal distribution is finally solved as:

$$f^*_a(x) = \frac{1}{\sqrt{2\pi(\sigma_0^2 + \sigma^2)}} e^{\frac{\kappa_2 - \kappa_1}{\kappa_1} - \frac{1}{\kappa_1} x [x-2(\mu_0+\mu)] - \frac{[x-(\mu_0+\mu)]^2}{2(\sigma_0^2+\sigma^2)}}; \tag{11}$$

the optimal data stealthy attack scheme is a method for sampling an attack signal from the optimal attack signal distribution to attack the networked system;
in step (c), the determining a moment of adding a privacy noise through a privacy noise scheduling scheme comprises:
adding a random noise $\eta_k$, conforming to the Gaussian distribution into a real-time measurement value $y_k$ requiring privacy protection to obtain disturbance data $\tilde{y}_k$, wherein the variance of the random noise $\eta_k$ is:

$$\sigma_0^2 = \frac{2(\Delta f)^2 \ln(1.25/\delta)}{\epsilon^2} \tag{12}$$

$$\Delta f = \max_{D,D'} \|f(D) - f(D')\|_2 \tag{13}$$

in Eqs. (12) and (13), $\Delta f$ is global sensitivity; D and D' are adjacent data sets obtained from statistical characteristics of the real-time measurement value, namely $\|D-D'\| \leq 1$; $\epsilon$ is a privacy budget at each time; $\delta$ is another privacy parameter of a ($\epsilon,\delta$)-differential privacy protection scheme having a value range of $0 < \delta < 1$; a disturbed real-time measurement value after adding the disturbance Gaussian noise is:

$$\tilde{y}_k = y_k + \eta_k = Cx_k + v_k + \eta_k \tag{14}$$

in Eq. (14), $\eta_k$ and $y_k$ have the same dimension;
the following state feedback mode is considered:

$$u_k = L\hat{x}_k \quad (15)$$

in Eq. (15), L is a feedback gain, $\hat{x}_k$ is a system state estimation value at time k, a state residual is $e_k = x_k - \hat{x}_k$, and an expanded system state is rewritten as:

$$z_k = \begin{bmatrix} x_k \\ e_k \end{bmatrix} \quad (16)$$

an iteration form of the expanded system state is as follows:

$$z_{k+1} = \begin{bmatrix} A+BK & -BK \\ 0 & A-LC \end{bmatrix} z_k + \begin{bmatrix} I & 0 \\ I & -L \end{bmatrix} \begin{bmatrix} w_k \\ v_k \end{bmatrix} \quad (17)$$

in Eq. (17), $z_{k+1}$ represents the expanded system state at time k+1; I is an identity matrix of the same dimension as A, and K represents a Kalman gain matrix;

$$F = \begin{bmatrix} A+BK & -BK \\ 0 & A-LC \end{bmatrix}, G = \begin{bmatrix} I & 0 \\ I & -L \end{bmatrix}, \psi_k = \begin{bmatrix} I & 0 \\ I & -L \end{bmatrix}\begin{bmatrix} w_k \\ v_k \end{bmatrix} \quad (18)$$

in Eq. (18), F is a first auxiliary matrix, G is a second auxiliary matrix, and $\psi_k$ is a third auxiliary matrix; a covariance matrix of $\psi_k$ is:

$$R_{\psi_k} = E[\psi_k \psi_k^T] = G\begin{bmatrix} R_w & 0 \\ 0 & R_v \end{bmatrix} G^T \quad (19)$$

in Eq. (19), E represents the expectation;
if the expectation and covariance of the expanded system state are $m_k$, $n_k$, respectively,
an iteration form of is:

$$n_k = E[(z_k - m_k)(z_k - m_k)^T]$$

$$n_{k+1} = F n_k F^T + R_{\psi_k} \quad (20)$$

the covariance matrix of $\psi_k$ after adding the differential privacy noise is rewritten as:

$$R_{\psi_k} = G\begin{bmatrix} R_w & 0 \\ 0 & R_v + R_{\eta_k} \end{bmatrix} G^T \quad (21)$$

in Eq. (21), $R_{\eta_k} = \sigma_0^2 \cdot I$ is the covariance matrix of the added differential privacy noise;
the covariance of the expanded system state is:

$$n_{k+1} = F n_k F^T + R_{\psi_k} + R_{\eta_k} \quad (22)$$

if the covariance of the expanded system state at a start time is $n_0$, $$n_{k+1} = F^k n_0 (F^k)^T + \sum_{i=1}^{k} F^{k-i} R_{\psi_i} [F^{k-i}]^T \quad (23)$$

when $F^k$ represents a $k^{th}$ power of a Kalman gain matrix F, $F^{k-i}$ represents a k–$i^{th}$ power of the Kalman gain matrix F, and i is a summation variable, if all eigenvalues of F are less than 1, namely (A+BK)(A−LC)<1, $n_k$ win converge to a constant N, and the variance of an added actual noise satisfies:

$$R_{\eta_k} > (\sigma')^2 I - NCC^T - R_v \quad (24)$$

in Eq. (24), $(\sigma')^2$ is a total noise scale for achieving differential privacy protection;
the goal is to maximize a detection rate of a stealthy attack at an acceptable control cost:

$$\max_\theta P_d \quad (25)$$
$$\text{s.t.} \bar{J} < \Omega$$

in Eq. (25), $$\theta = \{\theta_0, \theta_1, \ldots, \theta_M\}$$

is a sequence of privacy noises added within a time period M, wherein 1 represents noise addition, and 0 represents no noise addition; $\bar{J}$ represents the control cost; and $\Omega$ represents an upper limit of the acceptable control cost.

2. The method for detecting a data stealthy attack on a networked system with differential privacy protection according to claim 1, wherein the modeling a networked system in step (a) comprises:
modeling the networked system as a linear time-invariant model:

$$\begin{cases} x_{k+1} = Ax_k + Bu_k + w_k \\ y_k = Cx_k + v_k \end{cases} \quad (1)$$

wherein in Eq. (1), $x_k$ represents a system state at time k; $x_{k+1}$ represents a system state at time k+1; $u_k$ represents a control signal generated by a controller; $y_k$ represents a measurement value of the sensor on a controlled object received by the controller; the system parameters A, B, C are known constant matrices: A is a system matrix, B is a control matrix, and C is an observation matrix; $w_k$, $v_k$ represent a process noise and a measurement noise, respectively, which are subject to a Gaussian distribution with a mean of 0 and a covariance of $R_w$ and $R_v$.

3. The method for detecting a data stealthy attack on a networked system with differential privacy protection according to claim 1, wherein in step (a), the designing an attack detection scheme based on system noise parameters comprises:
determining the decision of control information by negative feedback determined by the measurement value, wherein when a difference between a state estimation value and an observation value is greater than a certain threshold, a signal at the current time is attacked.

4. The method for detecting a data stealthy attack on a networked system with differential privacy protection according to claim 1, wherein an approximate detection rate is introduced into the maximization of the detection rate of the stealthy attack at the acceptable control cost:

$$\beta_k = \begin{cases} \beta_k^1, & \text{if } \eta_k \neq 0, y_k^a \neq 0 \\ \beta_b^2, & \text{if } \eta_k \neq 0, y_k^a = 0 \\ \beta_k^3, & \text{if } \eta_k = 0, y_k^a \neq 0 \\ 0, & \text{if } \eta_k = 0, y_k^a = 0 \end{cases} \quad (26)$$

in Eq. (26), $\eta_k$, $y_k^a$ represent a privacy noise and an attack signal added at time k, respectively, and a missed detection rate at time k is $$\xi_k^j = 1 - \beta_k^j, \, j = \{1, 2, 3\};$$

if $OT_{\beta_j}$ represents the number of attacks over a period of time, a total missed detection rate is represented as:

$$P_{ud} = \prod_{j=1}^{3} (\xi^j)^{OT_{\beta_j}} \quad (27)$$

$\xi^j$ represents the missed detection rate in the first three cases described in Eq. (26);
an average missed detection rate is obtained by averaging the total missed detection rate:

$$\overline{P}_{ud} = \frac{1}{M} \sum_{i=0}^{M-1} P_{ud} \quad (28)$$

the optimization problem is rewritten as:

$$\max_{\theta} P_d \quad (29)$$

$$\text{s.t. } \frac{q}{M} < \Theta$$

in Eq. (29), $$\max_{\theta} P_d$$

refers to that the goal is to maximize the detection rate of the stealthy attack at the acceptable control cost in Eq. (25), and $P_d$ is the detection rate of the stealthy attack; q represents the number of additions of the privacy noise, and θ is the percentage of noise converted at the same control cost; when $\xi^1 \neq \xi^2 \xi^3$ is satisfied, $$\frac{-2(1 + \xi^1 - \xi^2 - \xi^3)}{\min(\xi^1, \xi^2, \xi^3) \ln \frac{\xi^1}{\xi^2 \xi^3}} \leq \frac{1}{M} \quad (30)$$

the moment of adding the privacy noise is finally solved.

\* \* \* \* \*